Feb. 8, 1966     T. P. BROWN     3,233,913
TRAILER SOCKET HITCH ANTI-THEFT DEVICE
Filed Oct. 1, 1962
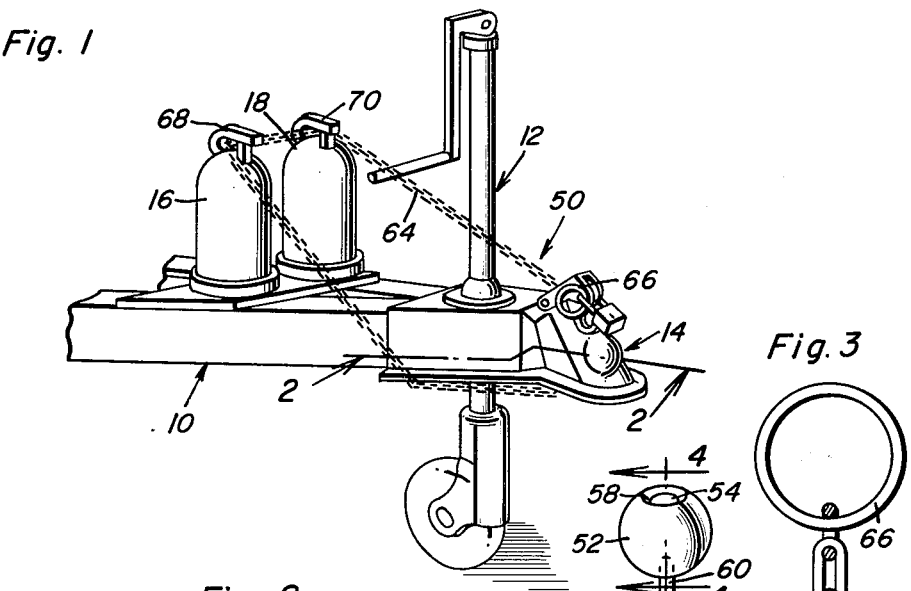
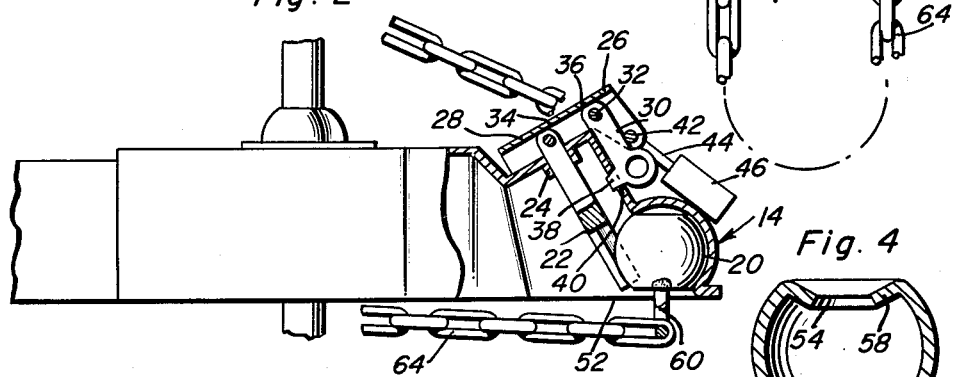
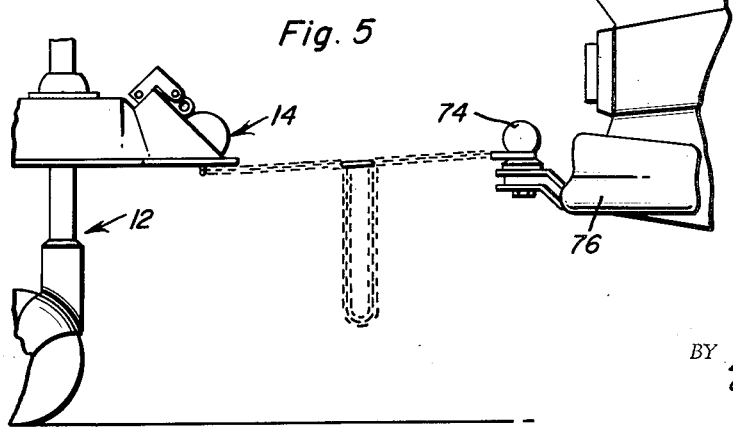
Thomas P. Brown
INVENTOR.

United States Patent Office 3,233,913
Patented Feb. 8, 1966

1

3,233,913
TRAILER SOCKET HITCH ANTI-THEFT DEVICE
Thomas P. Brown, Box 517, Highway 35, Belmar, N.J.
Filed Oct. 1, 1962, Ser. No. 227,175
2 Claims. (Cl. 280—507)

This invention relates to a novel and useful trailer socket hitch anti-theft device and more specifically to an apparatus which may be engaged with the socket hitch of a trailer to prevent that socket hitch from being connected to a ball hitch of a towing vehicle thereby preventing the trailer from being stolen by connecting its socket hitch to the ball hitch of a towing vehicle in the conventional manner.

Oftentimes house trailers and the like are left unattended with the forward end thereof supported by a dolly wheel. When an unattended trailer is not coupled to a towing vehicle in the conventional manner, it is very easy for a person wishing to have unauthorized use of the trailer to position the ball hitch of a draft vehicle beneath the socket hitch of the trailer and then to lower the socket hitch down into engagement with the ball hitch thereby coupling the trailer to the draft vehicle on which the ball hitch is mounted. Thereafter, it is only necessary for the person attempting to have unauthorized use of the trailer to fully retract the dolly wheel whereupon the trailer may then be towed away by the draft vehicle.

It is accordingly the main object of this invention to provide a means by which the socket hitch of a trailer may be rendered inoperative for connection to a conventional ball hitch element.

A further object of this invention, in accordance with the preceding object, is to provide an apparatus which will not only render the socket hitch element of a trailer inoperative for connection to a ball hitch element but which will also provide a means whereby numerous exteriorly located and removable trailer accessories may be tethered to the trailer in a manner preventing their unauthorized removal.

A still further object of this invention, in accordance with the preceding objects, is to provide a means by which a conventional trailer, having its forward ends supported by means of a dolly wheel, may be readily towed for short distances behind a draft vehicle without lifting the weight of the front end of the trailer from the dolly wheel assembly.

A final object to be specifically enumerated herein is to provide an anti-theft device in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a perspective view of the front end of a trailer tongue shown supported by means of a vertically adjustable dolly wheel assembly and with the anti-theft device of the instant invention operatively associated with the ball hitch element on the trailer tongue and connected to removable trailer accessories supported from the trailer tongue in a manner whereby the ball hitch element on the trailer tongue may not be connected to a ball

2 hitch element in the conventional manner and the removable trailer accessories are tethered to the trailer;

FIGURE 2 is a fragmentary longitudinal vertical sectional view taken substantially upon the plane indicated by the section line 2—2 of FIGURE 1;

FIGURE 3 is a perspective view of the anti-theft device with parts thereof being broken away;

FIGURE 4 is a fragmentary enlarged sectional view taken substantially upon the plane indicated by the section line 4—4 of FIGURE 3; and FIGURE 5 is a side elevational view of the trailer hitch anti-theft device being utilized to connect the ball hitch element of a draft vehicle with the socket hitch element of the trailer while the trailer is being supported by the caster wheel assembly.

Referring now more specifically to the drawings the numeral 10 generally designates a trailer tongue which may be of conventional design and of the type normally utilized on the forward end of a house trailer. The trailer tongue is provided with a vertically adjustable caster wheel assembly generally referred to by the reference numeral 12 which is utilized to support the forward end of the tongue 10 in an elevated position and the tongue 10 also includes a socket hitch assembly generally referred to be the reference numeral 14 which is also supported from the forward end of the trailer tongue 10. In addition, a pair of bottles or tanks 16 and 18 containing compressed cooking gas are also supported from the tongue 10.

With attention now directed to FIGURE 2 of the drawings it may be seen that the socket hitch assembly 14 defines a partial spherical downwardly opening socket 20 and that it is provided with retaining means in the form of a forked retainer 22 which is mounted for longitudinal reciprocation through a sleeve portion 24 of the socket hitch assembly 14. Actuating means in the form of a lever 26 is provided and is pivotally secured to the upper end of the forked retainer 22 by means of pivot pin 28 and may be utilized to cam the forked retainer upwardly out of its lowered locked position illustrated in FIGURE 2 of the drawings upon upward swinging movement of the forward end of the actuating lever 26. The actuating lever 26 has a locking lever 30 pivotally secured thereto by means of a pivot pin 32 and it may be seen that the actuating lever 26 is generally U-shaped in cross-section and includes a pair of sides 34 interconnected by means of a bight portion 36. The free end of the locking lever 30 includes a lug portion 38 which is receivable in an opening 40 formed in the socket hitch assembly 14. The sides 34 of the actuating lever 26 are provided with a pair of aligned bores 42 through which one leg portion of the hasp 44 of a padlock 46 may be secured in order to prevent pivotal movement of the locking lever 30 sufficient to retract the lug portion 38 from the opening 40. Accordingly, it may be seen that when the hasp 44 is passed through the bores 42 with the actuating and locking levers 26 and 30 positioned as illustrated in FIGURE 2 of the drawing, the forked retainer 22 may not be retracted from the locked position illustrated in FIGURE 2 of the drawings.

The preceding description may be considered as conventional and it is to be understood that all portions of the invention will be described hereinafter.

The anti-theft device of the instant invention is generally referred to by the reference numeral 50 and includes a partial spherical member 52 which is hollow and is provided with diametrically opposite bores 54 and 56. The partial spherical member 52 is devoid of a threaded shank portion or other conventional means by which it may be fixedly secured to a towing hitch of a draft vehicle and may therefore be termed as "blind" so as to distinguish the member 52 from a conventional ball hitch element used for towing purposes and provided with a generally radially outwardly projecting shank adapted for securement to the mounting portion of a conventional ball hitch. Further, although the spherical member 52 has been illustrated as being hollow, it is to be noted that it may be solid if desired. The portion of the spherical member 52 in which the bore 54 is formed is slightly dished as at 58 and an apertured mounting lug 60 is secured in the bore 56 in any convenient manner such as by welding 62. It is to be noted that the partial spherical member 52 is of a size enabling it to be snugly received and locked in the socket 20 by means of the forked retainer 22 in the conventional manner. One end of an elongated flexible thrust preventing tie member comprising a chain 64 is secured to the apertured mounting lug 60 and the other end of the chain 64 has a ring 66 secured thereto. It is to be noted that the ring 66 is of a size to snugly receive the partial spherical member 52 therethrough when the chain 64 is engaged therewith. Inasmuch as the ring 66 is of a size enabling the partial spherical member 52 to be passed therethrough, the major diameter portion of a conventional ball hitch such as that adapted to be utilized in connection with the socket hitch element 14 will also pass through the ring 66.

In operation, the partial spherical member 52 may be secured within the socket 20 in the conventional manner. Thereafter, the end of the chain 64 having ring 66 mounted thereon may be passed through the handles 68 and 70 on the tanks 16 and 18. Finally, the ring 66 may have the hasp 44 passed therethrough as the hasp 44 is also passed through the aligned bores 42 in order to secure the fork retainer 22 in the locked position. With the partial spherical member 52 secured within the socket 20, it is obvious that the socket hitch assembly 14 may not be utilized in the conventional manner for connecting the trailer tongue 10 to the tow hitch element of a draft vehicle. Additionally, since the chain 64 is passed through the handles 68 and 70, the compressed gas tanks 16 and 18 may not be stolen without breaking the handles 68 and 70 or the chain 64. Further, the two ends of the chain 64 may be secured together by means of the padlock 46 with the chain 64 looped through the trailer tongue and about a convenient portion of the vehicle 76 whereby the chain 64 will serve as a safety chain when the house trailer is being trailed behind the vehicle 76.

With attention now directed to FIGURE 5 of the drawings it may be seen that the partial spherical member 52 has been secured within the socket 20 as hereinbefore described. Then, the ring 66 has been slipped over the ball hitch element 74 which is secured to the rear end of a draft vehicle 76. In this manner, the trailer of which the tongue 10 comprises a part may be towed for short distances while the front end of the tongue 10 remains supported by means of the vertically adjustable swivel wheel assembly 12.

The anti-theft device 50 may be used to great advantage by individual trailer owners, as a means by which banks may "seal" a trailer to prevent it from being towed away in the event of repossession of the trailer, and by trailer dealers on the display trailers on their lots and especially on unattended lots to discourage theft of trailers.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with a trailer having a socket hitch of the type including means defining a downwardly opening partial spherical socket and having retaining means movably mounted on said socket hitch for movement between locked and unlocked positions and adapted to engage and releasably retain a ball hitch element seated and swivelly secured in said socket, said socket hitch being provided with a lockable movable actuator means operatively connected to said retaining means and movable between first and second positions for moving said retaining means between locked and unlocked positions, respectively, means locking said actuator means in said first position, a generally spherical member of a size receivable and lockable in said socket hitch by movement of said actuator means to said first position, said generally spherical member being blind and therefore free of means adapted for rigid connection to a draft vehicle whereby when said actuator means is locked in said first position, with said generally spherical member disposed in said socket hitch, it will be impossible to remove said spherical member from said socket and the engagement of said trailer socket with a ball hitch element supported from a draft vehicle in the usual manner and the theft of a trailer to which said socket hitch is secured by trailing the said trailer behind a draft vehicle in the usual manner will be prevented, said trailer including trailer accessories removably positioned thereon adjacent said socket hitch, said spherical member including a mounting lug fixedly secured thereto and projecting outwardly therefrom, an elongated and flexible theft preventing tie member having one end secured to said mounting lug, said means releasably locking said actuator means in said first position including means releasably locking said other end of said tie member to said actuator means, said tie member having a portion thereof intermediate its opposite ends secured to said accessories.

2. In combination with a trailer having a socket hitch of the type including means defining a downwardly opening partial spherical socket and having retaining means movably mounted on said socket hitch for movement between locked and unlocked positions and adapted to engage and releasably retain a ball hitch element seated and swivelly secured in said socket, said socket hitch being provided with a lockable movable actuator means operatively connected to said retaining means and movable between first and second positions for moving said retaining means between locked and unlocked positions, respectively, means locking said actuator means in said first position, a generally spherical member of a size receivable and lockable in said socket hitch by movement of said actuator means to said first position, said generally spherical member being blind and therefore free of means adapted for rigid connection to a draft vehicle whereby when said actuator means is locked in said first position, with said generally spherical member disposed in said socket hitch, it will be impossible to remove said spherical member from said socket and the engagement of said trailer socket with a ball hitch element supported from a draft vehicle in the usual manner and the theft of a trailer to which said socket hitch is secured by trailing the said trailer behind a draft vehicle in the usual manner will be prevented, said generally spherical member including a mounting lug which is fixedly secured thereto and projects outwardly therefrom and has one end of an elongated and flexible theft preventing tie member secured thereto, the other end of said tie member including means adapted to be secured to said actuator means when the latter is locked in said first position, said means on said other end of said tie member including a ring through which said generally spherical member is snugly receivable, whereby said ring is adapted to be slipped over a conventional ball hitch of a size adapted to be received in said socket hitch and utilized as a connection to tow said trailer short distances when the forward end of said trailer is supported by a dolly wheel assembly.

(References on following page)

References Cited by the Examiner

UNITED STATES PATENTS

| | | | |
|---|---|---|---|
| 1,390,402 | 9/1921 | Vincent | 70—15 X |
| 1,464,262 | 8/1923 | Fish | 70—15 X |
| 2,166,208 | 7/1939 | Dayton | 280—513 |
| 2,571,349 | 10/1951 | Eckles | 280—507 X |
| 2,788,990 | 4/1957 | Barcafer | 280—457 |
| 2,992,832 | 7/1961 | Robinson | 280—511 X |
| 3,139,291 | 6/1964 | Geresy | 280—507 |

LEO FRIAGLIA, *Primary Examiner.*

BENJAMIN HERSH, A. HARRY LEVY, *Examiners.*

R. C. PODWIL, *Assistant Examiner.*